US008108001B2

(12) United States Patent
Chishti et al.

(10) Patent No.: US 8,108,001 B2
(45) Date of Patent: Jan. 31, 2012

(54) SYSTEMS AND METHODS FOR A SIMPLIFIED MOBILE PHONE

(75) Inventors: Zia Chishti, Washington, DC (US); Stuart J. Spottiswoode, Beverly Hills, CA (US)

(73) Assignee: TRG, Washington, DC (US)

( * ) Notice: Subject to any disclaimer, the term of this patent is extended or adjusted under 35 U.S.C. 154(b) by 1092 days.

(21) Appl. No.: 11/949,733

(22) Filed: Dec. 3, 2007

(65) Prior Publication Data

US 2009/0143103 A1 Jun. 4, 2009

(51) Int. Cl.
  *H04B 1/38* (2006.01)
  *H04M 1/00* (2006.01)
  *H04M 3/00* (2006.01)
  *H04W 4/00* (2009.01)

(52) U.S. Cl. .............. 455/558; 455/575.1; 455/575.2; 455/466; 455/461; 455/419; 709/206

(58) Field of Classification Search .......... 455/558, 455/575.1, 575.2, 466, 461, 419; 709/206
See application file for complete search history.

(56) References Cited

U.S. PATENT DOCUMENTS

| 6,035,217 | A | 3/2000 | Kravitz | |
|---|---|---|---|---|
| 6,917,802 | B1 * | 7/2005 | Nilsson | 455/419 |
| 2004/0223603 | A1 * | 11/2004 | Pence et al. | 379/265.02 |
| 2004/0249915 | A1 * | 12/2004 | Russell | 709/223 |
| 2004/0253999 | A1 * | 12/2004 | Castaneda, Jr. | 455/575.2 |
| 2005/0048998 | A1 * | 3/2005 | Zhu | 455/550.1 |
| 2006/0014530 | A1 * | 1/2006 | Denenberg et al. | 455/414.1 |
| 2006/0031364 | A1 * | 2/2006 | Hamilton et al. | 709/206 |
| 2006/0128363 | A1 * | 6/2006 | Cooling et al. | 455/412.1 |
| 2006/0135214 | A1 * | 6/2006 | Zhang et al. | 455/569.1 |
| 2007/0123276 | A1 * | 5/2007 | Parker et al. | 455/461 |

OTHER PUBLICATIONS

Jott Press Release "Jott Networks Adds New Productivity Features" Sep. 5, 2007.

* cited by examiner

*Primary Examiner* — Dwayne Bost
*Assistant Examiner* — Ariel Balaoing
(74) *Attorney, Agent, or Firm* — Tran & Associates (57) ABSTRACT

Systems and methods for communicating through a mobile phone are disclosed with a buttonless mobile phone including a power supply with means for capable of enabling or disabling the a power supply; and memory to store a phone number directed to a remote station; a remote station to receive a call from a user causing the mobile phone to call the remote station, the remote station comprising allowing a human operator and access to a database describing at least one contact unique to the user; and wherein the human operator uses the database of contact information to facilitate a communication from the user to the contact in the database.

19 Claims, 5 Drawing Sheets

SYSTEMS AND METHODS FOR A SIMPLIFIED MOBILE PHONE

FIELD OF INVENTION

The present invention relates to the field of mobile phone communications.

BACKGROUND OF THE INVENTION

Mobile phone use throughout the world has become widespread and is expected to grow as the costs of the devices and cellular network access decreases. With the advent of newer and more compact components, mobile phones have evolved from heavy, brick-like devices that can only send or receive a call, to compact and lightweight devices that typically include, in addition to the phone hardware itself, a video screen, camera, substantial memory, powerful computer processors, high-volume speakers, and data ports. These devices have become more than just phones, and can be used to take still pictures or video, send or receive email, Short Message Service (SMS) and Instant Message (IM) communications, store and play music, watch video, and browse the Internet.

As mobile phones have incorporated these capabilities, the ability for a user to manage and access them has become more complex, typically involving multiple buttons, wheel or trackwheels, menus, submenus, and hotkeys. For example, instead of a simple numeric keypad, many mobile phones now incorporate full keyboards to type out email and SMS messages. Increasing the number of buttons on a phone, however, dictates that the size of the mobile phone not go beyond a certain limit, as the buttons would become too small for effective use. In an effort to overcome this inherent limitation, mobile phones have been developed to fold out or slide out to temporarily increase its size for full keyboard use. Other mobile phones incorporate software that allows a single button to potentially input different letters, thereby decreasing the number of buttons required for typing out email or SMS messages.

Though most efforts are being made to add functionality to mobile phones, (inherently making them more complex) some have attempted to simplify their input systems. For example, U.S. Pat. No. 6,035,217 describes a mobile phone with a single button. The button can be used to pick up an incoming call, hang up, or turn the device on or off. When the user desires to place a call, they depress the button, which automatically calls a predetermined phone number to connect the user to a service provider that connects the user to the desired phone number. U.S. Pat. No. 6,917,802 describes a mobile phone without any buttons besides an on/off switch. In place of buttons, voice commands are used to initiate, pick up, or hang up a call. When the command is made to initiate a call, the mobile phone calls a predetermined phone number to connect to a voice dialing server. The user then recites a keyword or a phone number to be dialed, which the voice server automatically dials and conferences in the user's mobile phone.

Simplified mobile phones as previously described offer several advantages over the hardware-heavy mobile phones typically in use today. Simplified mobile phones can be engineered to be much more compact than a mobile phone, and their simplicity in function better allows for the design of extensive battery life for the device. Simplified mobile phones also make more likely to possibility of designing a device with a low manufacturing cost, maybe even to the extent that it would be economically feasible to provide a mobile phone service whereby mobile phones can be recycled or discarded.

Nevertheless, the simplified phones described are not without their problems. A phone that has even a single button to initiate or pick up calls can require that the mobile phone user find the button to depress it, which could be problematic during certain situations, such as if the user is driving an automobile. Likewise, the use of voice dialing servers are inherently prone to error in recognizing voice commands. Background noise, language accents, and noisy mobile phone signals can thwart the server's ability to recognize what number the user desires to dial. The specific software hierarchy of the server also makes it inherently inflexible and thereby a potential source of frustration to a mobile phone user. Most notably, a voice dialing server can only serve a single purpose—to dial phone numbers on command. A voice dialing server cannot be effectively used to send or receive the text messages that are commonly exchanged between mobile phone users (e.g., email, SMS, IM).

It is therefore preferred to provide a simplified, buttonless mobile phone system that does not rely on voice dialing servers and that allows the transmission and receipt of text communications.

As a further point, many of today's mobile phones operate on the Global System for Mobile Communication (GSM) network. Mobile phones that operate on this network require a Subscriber Identity Module (SIM card), which is a portable memory chip that includes, among other things, the registration information used to connect a mobile phone to a specific mobile phone service provider. Mobile phone service providers, however, typically provide local call service within a specific geographic area. If a mobile phone user goes beyond this area, they incur "roaming charges" when making or receiving a call. These roaming charges are generally much more expensive than local mobile phone service charges.

To overcome this problem, individual SIM cards for a specific region have been made available for purchase by mobile phone users. Upon entering an area where the mobile phone user could incur roaming charges, the mobile phone user can open their phone and replace the SIM card with one that is local to the service area they have entered. In this way, the mobile phone user can avoid roaming charges. This method, however, is problematic in that it requires the mobile phone user to have a certain degree of sophistication in being able to replace a SIM card. It also requires that the mobile phone user identify and buy a SIM card that is compatible with their specific phone.

It is therefore preferred to provide a simplified, buttonless mobile phone system that more easily switches out SIM cards so that a mobile phone user can use a mobile phone service without incurring roaming charges.

SUMMARY OF THE INVENTION

In one aspect, a system for communicating through a mobile phone includes a buttonless mobile phone with a power supply capable of enabling or disabling power to the buttonless mobile phone; and memory to store a phone number directed to a remote station; and a remote station to receive a call from the mobile phone, the remote station allowing a human operator access to a database describing at least one contact unique to the user; wherein the operator uses the database of contact information to facilitate a communication from the user to the contact described in the database.

In another aspect, a system includes a buttonless mobile phone without a video screen, comprising a power supply with means for enabling or disabling the power supply; a remote station comprising a human operator with access to at least one text communication account of a user of the mobile phone; and the human operator reading to the user of the mobile phone at least some of the content of a text communication from the text communication account.

In yet another aspect, a communication device includes a buttonless mobile phone without a video screen; a power supply for enabling or disabling power to the buttonless mobile phone; and a headset housing.

In another aspect, a mobile phone telecommunications system includes a plurality of mobile phones, comprising a first mobile phone containing a SIM card that is compatible with a first mobile phone network and with memory storing a phone number directed to a remote station; a second mobile phone containing a SIM card that is compatible with a second mobile phone network and with memory storing a phone number directed to a remote station; at least one remote station comprising a database describing at least one contact unique to a user of the mobile phone telecommunications system. In one embodiment, the user causes the first mobile phone to call the remote station and have the remote station facilitate a communication from the user to a contact described within the database; and at a later time, the user causes the second mobile phone to call the remote station and have the remote station facilitate a communication from the user to a contact described within the database.

In yet another aspect, a mobile phone telecommunications system includes a plurality of mobile phones with a first mobile phone containing a SIM card that is compatible with a first mobile phone network and with memory storing a phone number directed to a remote station; a second mobile phone containing a SIM card that is compatible with a second mobile phone network and with memory storing a phone number directed to a remote station; at least one remote station comprising a human operator with access to at least one text communication account of a user of the mobile phone. The user causes the first mobile phone to call the remote station and have the human operator read to the user of the mobile phone at least some of the content of a text communication from the text communication account; and at a later time, the user causes the second mobile phone to call the remote station and have the human operator read to the user of the mobile phone at least some of the content of a text communication from the text communication account.

The system provides a simplified, buttonless mobile phone system that does not rely solely on voice dialing servers and that also allows the transmission and receipt of non-oral communications. This is primarily accomplished by using a human operator located at a remote station who has access to the contact information of a particular mobile phone user, potentially including any email, SMS, or IM accounts. In this manner, the human operator can, not only connect the mobile phone user to the desired number, but also, orally communicate to the mobile phone user and email, SMS, or IM messages received, and communicate email, SMS, or IM messages that the mobile phone user desires to be sent. A human operator can also theoretically offer the mobile phone user a variety of personal services, such as finding and buying tickets to a musical event, looking up information on the Internet, arranging for airline tickets, etc. . . . Indeed, the limit of the human operator to provide personal services to the mobile phone user will be generally limited only by the information and authorization that a mobile phone user is willing to provide to the mobile phone system described herein.

In one embodiment, the system comprises a system for communicating through a mobile phone, the system comprising: (1) a buttonless mobile phone with a power supply and means for enabling or disabling the power supply (e.g., a manual button, a heat sensor, a capacitance switch, etc. . . . ) and memory storing a preprogrammed phone number directed to a remote station; (2) a user causing the mobile phone to call the remote station, the remote station comprising a human operator and a database describing at least one contact unique to the user; and (3) the operator using the database of contact information to direct a communication from the user to a contact described within the database.

In another embodiment, the system comprises a system for receiving an email communication on a buttonless mobile phone without a video screen, the system comprising: (1) a buttonless mobile phone without a video screen and a power supply with means for enabling or disabling the power supply; (2) a remote station comprising a human operator with access to at least one email, SMS, or IM account of a user of the mobile phone; and (3) the human operator using the mobile phone to read to the user at least some of the content of an email, SMS, or IM message from the respective user account.

By simplifying the mobile phone input system, and by removing the need for a video screen to compose or read non-oral messages, the present invention enables one skilled in the art to design highly compact mobile phones with optimized shapes. For example, all the components necessary to operate a mobile phone with the present invention can be built into a housing shaped as a headset, much like the bluetooth headsets available on the market today. Unlike the bluetooth headsets, however, the headsets of the present invention will not depend on a separate mobile phone device with transmission and reception capabilities. Alternatively, a mobile phone to be used with the present invention can be shaped as a pendant to be worn around the neck, or as a brooch designed to be pinned to the collar of a shirt. Accordingly, one embodiment of the present invention comprises a buttonless mobile phone without a video screen, the phone comprising a power supply with means for enabling or disabling the power supply; and a housing in the shape of a headset. The mobile phone may also be designed such that it can be manually transformed by the user from a phone that can be worn as a headset to a phone that can be worn as a pendant or brooch, and vice-versa.

It is also an object of the present invention to provide a simplified, buttonless mobile phone system that more easily switches out SIM cards so that a mobile phone user can use a mobile phone service without incurring roaming charges. This is primarily accomplished by creating a system where, when the mobile phone user enters a geographic area where their first mobile phone could incur roaming charges, the mobile phone user obtains a second mobile phone with a SIM card with a registration for a local mobile phone service provider. By way of example, the mobile phone user can obtain the second mobile phone from a dispenser at an airport or train station, with the first mobile phone being thrown away or segregated for recycling. Since the mobile phone user's contact information is located at a remote station, the second mobile phone need only have in its memory a phone number to connect to a remote station. Upon contacting the remote station, the user can have the remote station facilitate communications through the second mobile phone without incurring roaming charges. This is a particular useful system where low-cost, compact, and simplified mobile cell phones are used, including those described within this disclosure.

One embodiment of the present invention accordingly comprises a mobile phone telecommunications system, the system comprising: (1) a plurality of mobile phones with a first mobile phone containing a SIM card that is compatible with a first mobile phone network and with memory storing a preprogrammed phone number directed to a remote station; (2) a second mobile phone containing a SIM card that is compatible with a second mobile phone network and with memory storing a preprogrammed phone number directed to a remote station; (3) at least one remote station comprising a database describing at least one contact unique to a user of the mobile phone telecommunications system; (4) the user causing the first mobile phone to call the remote station and have the remote station telephonically connect the user to a contact described within the database; and, (5) at a later time, the user causing the second mobile phone to call the remote station and have the remote station telephonically connect the user to a contact described within the database.

In another embodiment of the present invention, the mobile phone telecommunications system comprises (1) a plurality of mobile phones with a first mobile phone containing a SIM card that is compatible with a first mobile phone network and with memory storing a preprogrammed phone number directed to a remote station; (2) a second mobile phone containing a SIM card that is compatible with a second mobile phone network and with memory storing a preprogrammed phone number directed to a remote station; (3) a remote station comprising a human operator with access to at least one email, SMS, or IM account of a user of the mobile phone; and (3) the human operator using the first mobile phone to read to the user at least some of the content of an email, SMS, or IM message from the respective user account; and, (5) at a later time, the human operator using the second mobile phone to read to the user at least some of the content of an email, SMS, or IM message from the respective user account.

DETAILED DESCRIPTION OF THE INVENTION

Figure 1:
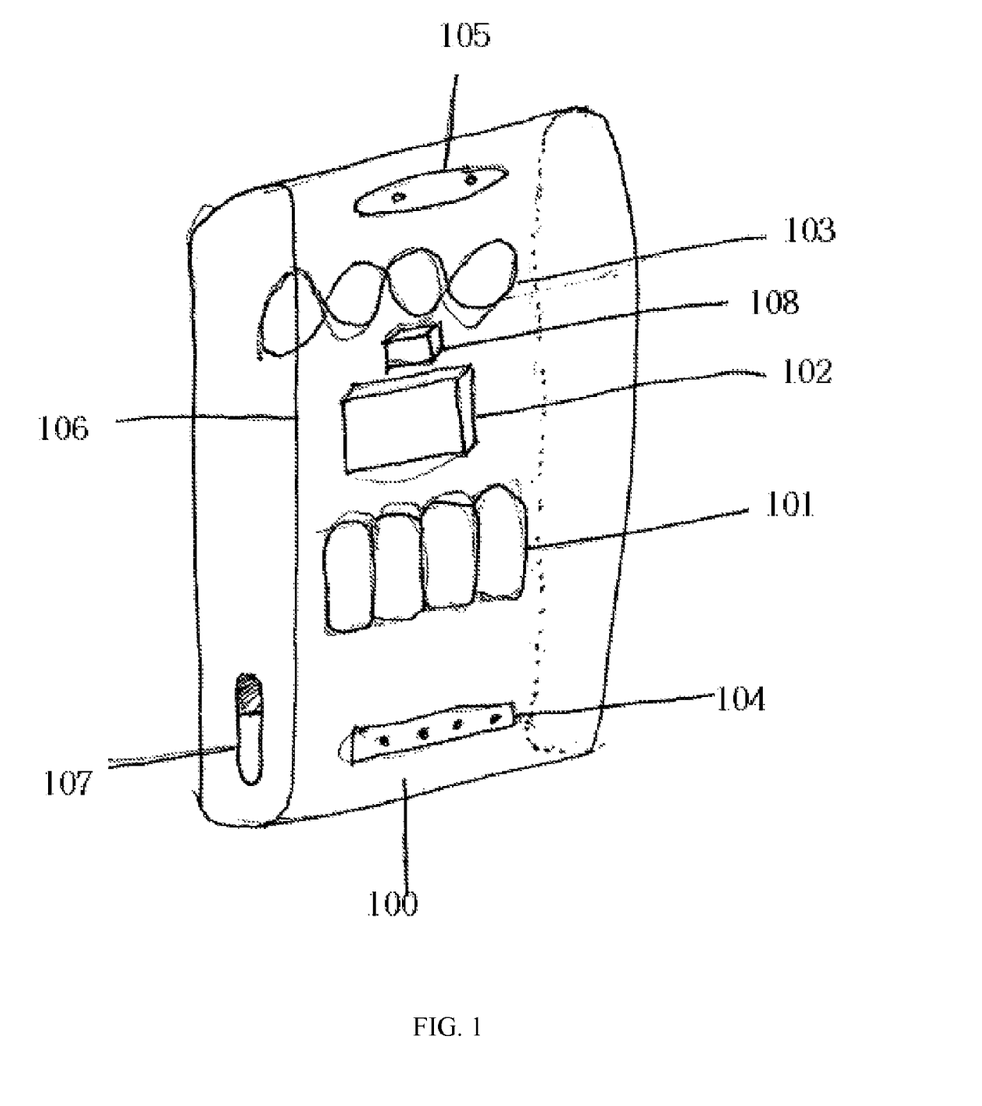
FIG. 1 is a diagram of a basic design of a mobile phone to be used in the systems of the present invention.

FIG. 1 reflects an embodiment of the present invention in its simplest form, as well as other potential embodiment. The simplest embodiment comprises the basic hardware necessary to the operation of a mobile phone 100, including a power source 101, transceiver 102, antennae 103, microphone 104, speaker 105, housing 106, and, in some embodiments, means for switching the power state of the mobile phone, such as a button or toggle switch 107.

Unlike most mobile phones, however, the mobile phones of the present invention are generally designed such that they have no buttons or touch screens other than what could be used to switch the power state of the device from on to off or vice-versa. Instead, oral commands and heat or capacitance sensors are used command the functionality of the phone, such as connecting to a desired telephone number or picking up an incoming call. For example, the mobile phone could be commanded to pick up an incoming call through monitoring of voice commands through the speaker 105, followed by a voice command being spoken. In another embodiment, a heat or capacitance sensor can be used to sense a touch on the housing 106 of the device. The touch, for example, could command the phone to pick up or hang up a call. The timing or pattern of the touch can also be used to distinguish between commands. For example, a long period of touching could be used as a command to change the power state of the device, while a shorter period of touching could be used as a command to pick up an incoming call. Likewise, a touch that ascends or descends along the vertical access of the device could be used as a command to respectively increase or decrease the volume of the speaker 105.

To be used with the systems of the present invention, the mobile phones also comprise a memory module 108. The memory module can be extraordinarily small, sufficient to store just a single telephone number, or it can be designed to have vast amounts of memory to allow for the storing of media files, such as digital music files, digital photographs, and digital movies. At the least, the memory module must be large enough to store data that enables the phone to connect to a remote station.

Figure 2:
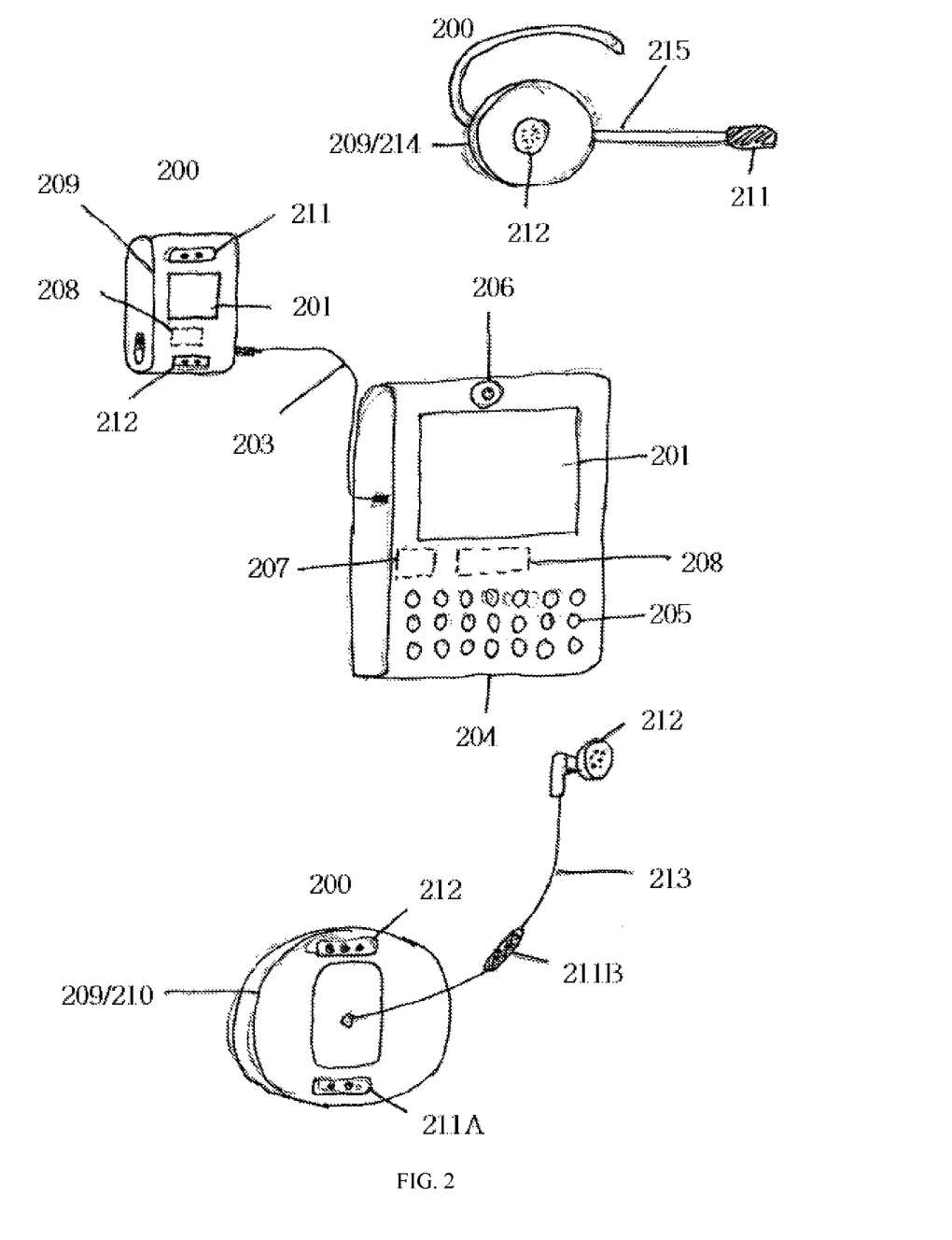
FIG. 2 is a diagram of various headset phones that are the subject of the present invention.

FIG. 2 reflects additional embodiments of the present invention. The mobile phones 200 to be used with the present invention can comprise a video screen 201, though it is preferred that the mobile phones be designed to not contain such a screen to take full advantage of minimal power requirements. In another embodiment, the mobile phone can also comprise a hardwire or wireless link 203 to a separate device 204 that comprises additional hardware, such as a video screen 201, keyboard 205, digital camera 206, or music player 207. The hardwire link 203 in particular can be one such that the separate device 204, or a number of separate devices, can be stacked onto the phone 200 so as to create a single hardware unit with multiple capabilities, such as, for example a phone with a video screen, or a phone with a keyboard or music player. The mobile phone 200 or the separate device 204 could also comprise a Global Position System (GPS) transceiver 208 or similar geolocation device.

Since the mobile phone 200 could only require simple operational hardware, the phone 200 can be designed to be highly compact and take on conformations that make it easy to carry. For example, the mobile phone 200 could take the shape of a bracelet, a watch, a pendant, sunglasses, or a necklace, with the housing 209 shaped appropriately. Preferably, the mobile phone 200 and the housing 209 are shaped as a brooch or pin 210 to be attached to the collar of a shirt or jacket. In this embodiment, the microphone 211 and speaker 212 could be fixed into the housing of the device 209. In another embodiment of the brooch device 210, one or both of the microphone 211 and speaker 212 could be pulled from the housing of the device 209, connected by, for example, a retractable wire 213. The mobile phone 200 and housing 209 of the present invention could also be shaped as a headset 214. In this embodiment, the headset would be worn on the head or ear of the user, with the microphone 211 placed near the tip of the boom 215 of the headset 214, and the speaker 212 placed nearer to the ear of the user. In a related embodiment, the headset can be manually transformed by the user into a phone that can be worn as a pendant or brooch, and vice-versa. In such an embodiment, upon transforming the phone from headset mode to pendant or brooch mode, the speaker 212 may be configured to operate as a speakerphone when the phone is in pendant or brooch mode. Other components, such as the microphone 211 can likewise be configured to operate as needed in a certain mode. Some embodiments of the present invention require a remote station, which generally comprises a human operator and a list of contact information unique to the user, such as a list of telephone numbers of colleagues previously provided by a mobile phone user. The remote station can also be configured to have access to the email, SMS, or IM accounts of the mobile phone user. The remote station can also comprise an automated voice input device that can receive oral commands and be programmed to take specific actions in response to those commands. The voice input could thus be used to minimize or eliminate any need to have a human operator control the function of the remote station at every level.

The remote station generally serves as a central repository of the user's contact information and can be used to facilitate the making of communications between the user of a mobile phone and another entity. For example, when a mobile phone user desires to telephonically connect to another individual, the user would command the mobile phone to connect with the remote station. Upon connection, the remote station receives instructions to telephonically connect the mobile phone user to a specific individual, most likely one who is listed in a database of unique contact information that the remote station has access to. If the specific individual to be called is not listed in the database, the mobile phone user can verbally communicate to the remote station the specific number to be called, with the remote station taking the appropriate action.

In the same manner, the remote station can be used by the mobile phone user to send an email, SMS, IM message, or other textual message. In this embodiment, the mobile phone user would command the phone to connect with the remote station. The remote station would then receive oral instructions to send a textual message to a specific individual identified in the database of unique contact information, with the textual message being dictated orally by the mobile phone user. Again, if the specific individual to be contacted is not listed in the database, the mobile phone user can verbally communicate to the remote station the specific contact information to be used, with the remote station taking the appropriate action.

Figure 3:
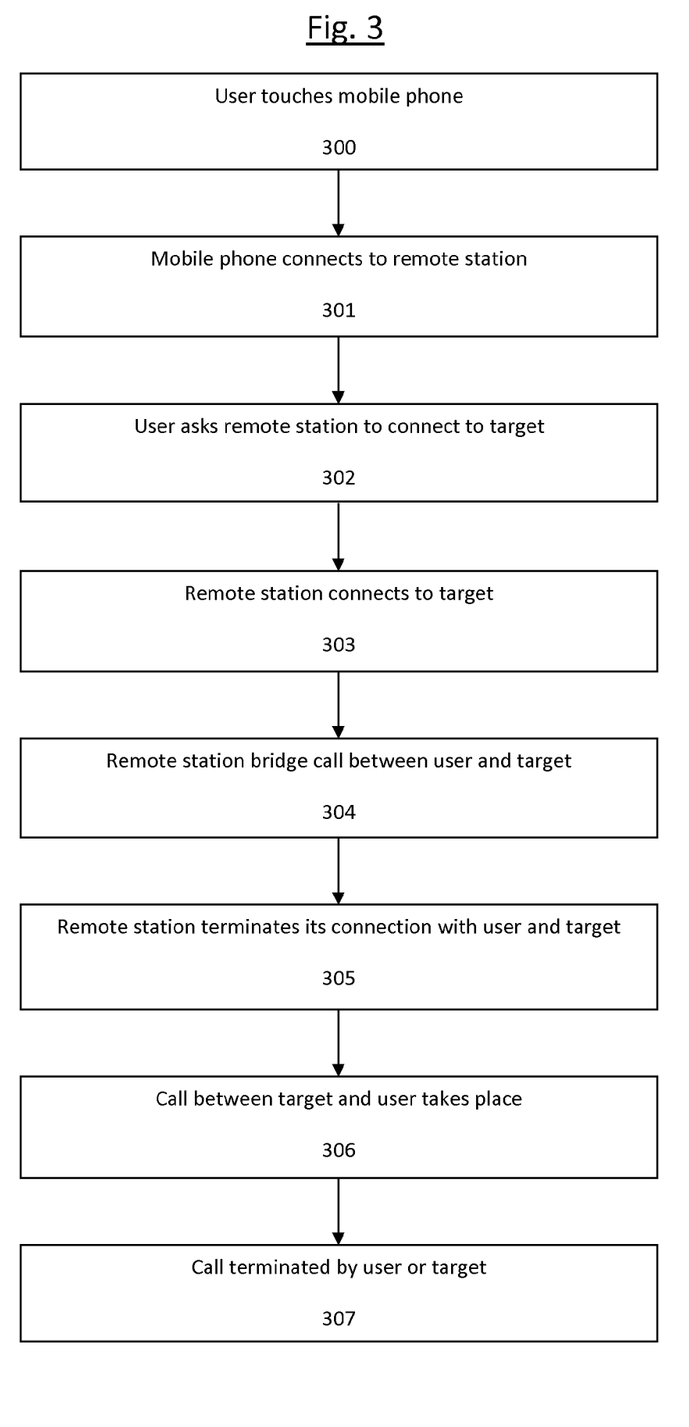
FIG. 3 is a flowchart depicting a process for initiating a phone call using system of the present invention.

FIG. 3 is a flowchart reflecting an embodiment of the present invention as it is used to initiate and terminate a phone call. In this embodiment, the mobile phone user touches the mobile phone 300, thereby commanding it to connect to a remote station 301. The mobile phone user then communicates to the remote station that they desire to place a call to a target identified in a database of contact information unique to the user 302. The remote station telephonically connects to the target 303, bridges the communications between the mobile phone user and the target 304, and then the remote station terminates its connection to both the mobile phone user and the target 305. The call between the mobile phone user and the target takes place 306, with the call being terminated either through the target terminating the call or the mobile phone user touching the mobile phone to give the appropriate termination command 307.

There are many variations of the embodiment reflected in FIG. 3. For example, instead of having the remote station telephonically connect to the target, the remote station can transmit to the mobile phone the contact information for the target, which is then stored in a memory module within the phone. The mobile phone could then be used to contact the target directly, obviating the need for the remote station to make the initial call to the target. Likewise, the mobile phone user could dictate the number of the call to be made instead of having the remote station access the database of unique contact information. The mobile phone user can also direct the remote station to stay on a specific call to, for example, input keytone commands during a call that requires such commands, such as when a customer service entity is called that requires the person calling to input their account numbers with the entity. Voice input devices could also be used with this system to minimize the need for a human operator at the remote station to make all the steps necessary to having the mobile phone user make a call to a target.

In another embodiment, the remote station can continue to stay on the call between the mobile phone user and their outgoing call target to ensure a reliable connection. In the event that the mobile phone user is unintentionally disconnected from the call, the presence of the remote station can ensure the continuation of the call with the outgoing call target, put the target on hold, call the mobile phone user again until connection is established, and then conference in the mobile phone user with the outgoing call target. The same method can be employed if the outgoing call target is unintentionally disconnected. By using this embodiment, both the outgoing call target and mobile phone user can avoid having to redial the other's phone number to reestablish connection. Reconnection is instead facilitated through the remote station and the call can be terminated only upon voice command.

Figure 4:
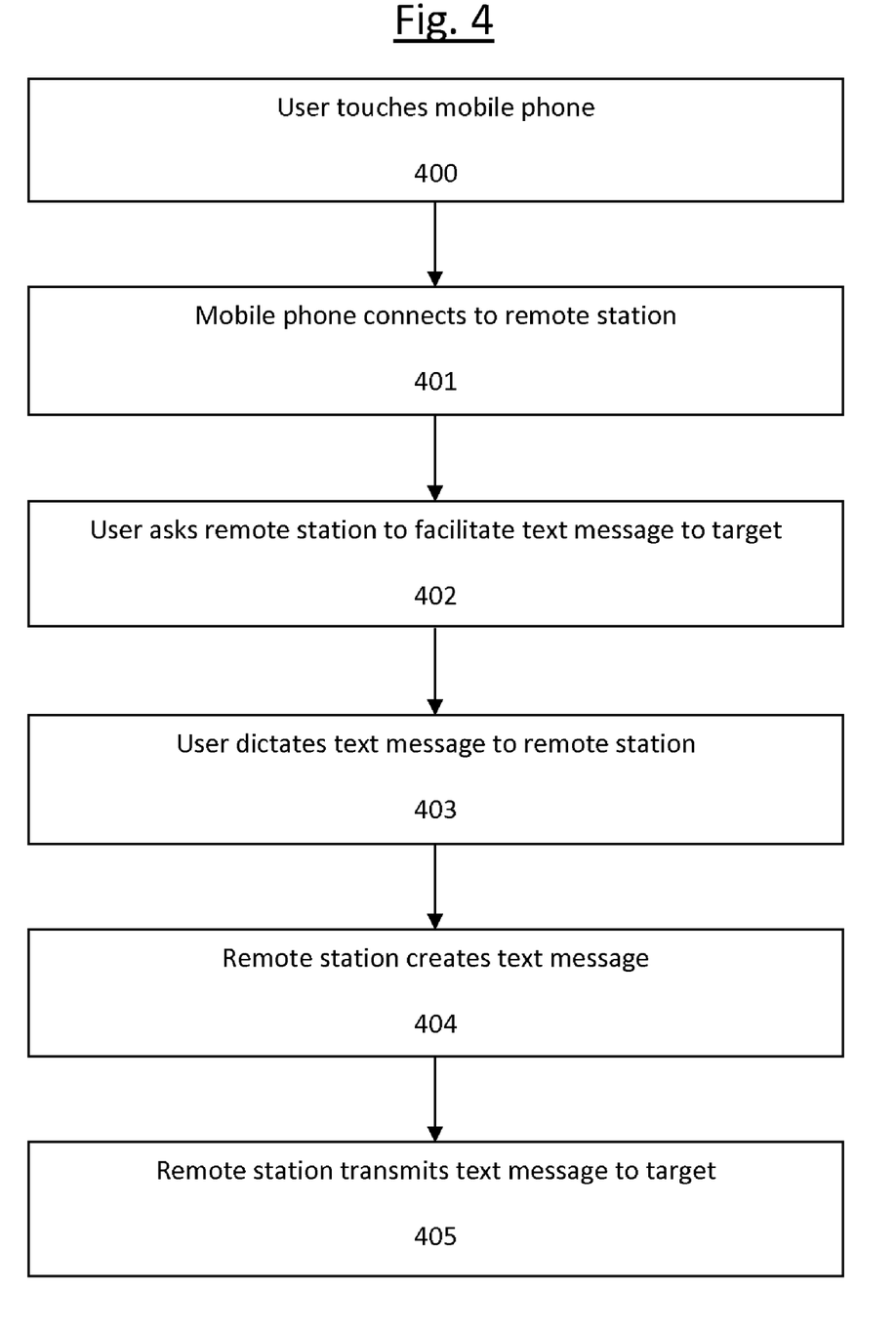
FIG. 4 is a flowchart depicting a process for sending a textual communication using system of the present invention.

FIG. 4 is a flowchart reflecting an embodiment of the present invention as it is used to send a textual message. In this embodiment, the mobile phone user touches the mobile phone 400, thereby commanding it to connect to a remote station 401. The mobile phone user then communicates to the remote station that they desire to make a textual message to a specific target 402, such as one identified in a database of contact information unique to the user. The mobile phone user dictates the textual message to be sent 403 and the remote station transforms that dictation into a textual message 404. The remote station then transmits the textual message to the target 405.

Embodiments of the present invention can also be used to receive phone calls or textual messages. For example, when a call is made to the mobile phone user, the call is can be placed directly to the phone number of the mobile phone user. The user would then pick up the call by touching the mobile phone to give the command to pick up the incoming call. In another embodiment, an incoming call to a mobile phone user can be picked up by a human operator. If the phone number of the incoming caller is listed among mobile phone user's unique contact information, the human operator can readily identify the incoming caller, put them on hold, contact the mobile phone user and announce who is calling, and if desired, connect the incoming caller with the mobile phone user. In the event that the incoming caller's phone number is not among the mobile phone user's unique contact information, the human operator optionally can set up an address for the incoming caller in the user's unique contact information and ask the incoming caller for their relevant information.

When a textual message is made to mobile phone user, the remote station can detect the making of this textual message and call the mobile phone user to notify them of the incoming message. At least some parts of the textual message is then orally communicated to the mobile phone user, such as the address of the sender, the time, or the specific message that is to be communicated. Preferably, the remote station contains a filter or protocol to minimize the chance that an incoming textual message is a "spam" or irrelevant textual message. In an alternative embodiment, the remote station can remain passive to the receipt of textual messages. When the mobile phone user desires to check the status of received textual messages, the mobile phone user contacts the remote station which then notifies the mobile phone user whether textual messages were received or not.

The present invention can also be designed to have functionality equivalent to or even beyond the functionality of most mobile phones. For example, an embodiment of the present invention could incorporate a voicemail feature. When voicemail message is received for a particular mobile phone user, the remote station can either call the mobile phone to notify the user of the existence of a voicemail message, or more preferably, the mobile phone would be notified of the existence of a voicemail message upon contacting the remote station. Management of the voice mailbox (e.g., storing, deleting, and playing messages) could be controlled through verbal commands given by the user to a voice input device, or it could be controlled by having the mobile phone user give instructions to a human operator at the remote station.

Another embodiment of the present invention could also incorporate an ability to customize settings for the mobile phone, such as ringer or volume settings. For example, the mobile phone user could contact the remote station to communicate specific settings to be applied to the phone. Some of those settings, such as volume and ringer settings could then be communicated back to the mobile phone from the remote station to change the settings of the mobile phone. Alternatively, the mobile phone user could access an Internet site to apply specific settings to the mobile phone. Those settings could then be communicated back to the mobile phone to change its settings.

An embodiment of the present invention could further incorporate the ability to play digital music files or experience other media files, such as digital photographs and video. To play a digital music file, the present invention could incorporate a large memory module in the mobile phone itself. When the mobile phone user desires to listen to a particular file, they can contact the remote station to identify the music file to be played (which can either be stored on a database that the remote station has access to, or which can be downloaded remotely). The remote station can transmit or stream the music file to the memory module in the phone, which can then play the music file and output sound through the speaker of the device. In the same manner, embodiments of the present invention can be used to experience other media files, so long as the mobile phone system incorporates the appropriate output devices.

Perhaps most advantageously, embodiments of the present invention can incorporate a human operator at a remote station, which provides the mobile phone communication system with a degree of flexibility unrivaled by the functionality provided by prior mobile phone communication systems. Using the present invention, the human operator can be used by the mobile phone user as a personal assistant to perform such tasks as browsing the Internet to identify an address or answer a particular question, order goods or services, or give navigational directions. Generally speaking, the present invention can provide expansive functionality through the use of a human operator, limited only by the amount of information and authorization the mobile phone user provides to the human operator.

Some embodiments of the present invention also provide advantages through enabling the design of a mobile cell phone that has minimal hardware components, and thus, a relatively low cost of manufacture. Mobile phones embodying the present invention could thus be used in a system where mobile phones are recycled or even discarded, especially given that all personal information typically loaded onto a mobile cell phone is accessible through a remote station. After the user of the system discards a mobile phone, they only need to obtain another mobile phone that can contact a remote station and thus obtain access to the mobile phone user's contacts and email, SMS, or IM accounts.

It is preferred that, when a user obtains a new mobile phone to be used with the present invention, the user immediately contacts the remote station to verify that the particular user is associated with a particular mobile phone. This can be done, for example, through the use of a security code specifically assigned to the mobile phone user. When the remote station assigns a particular mobile phone to a particular user, it is also preferred that the settings or other data stored on the previous mobile phone get transferred to the new mobile phone, thus providing a seamless switch for the mobile phone user.

In one embodiment of the present invention, a mobile phone telecommunications system can be designed to circumvent roaming charges. The mobile phone system accomplishes this by providing the mobile phone user with access to multiple mobile phones, with each incorporating a SIM card that contains registration information for a particular geographical area. Each phone will also have a preprogrammed phone number directed to a remote station. Upon entering or planning to enter a particular geographic area, the mobile phone user need only use the appropriate mobile phone to contact a remote station. There could be one remote station or multiple remote stations. The contacted remote station would need only have access to a database containing contact information unique to the mobile phone user.

Figure 5:
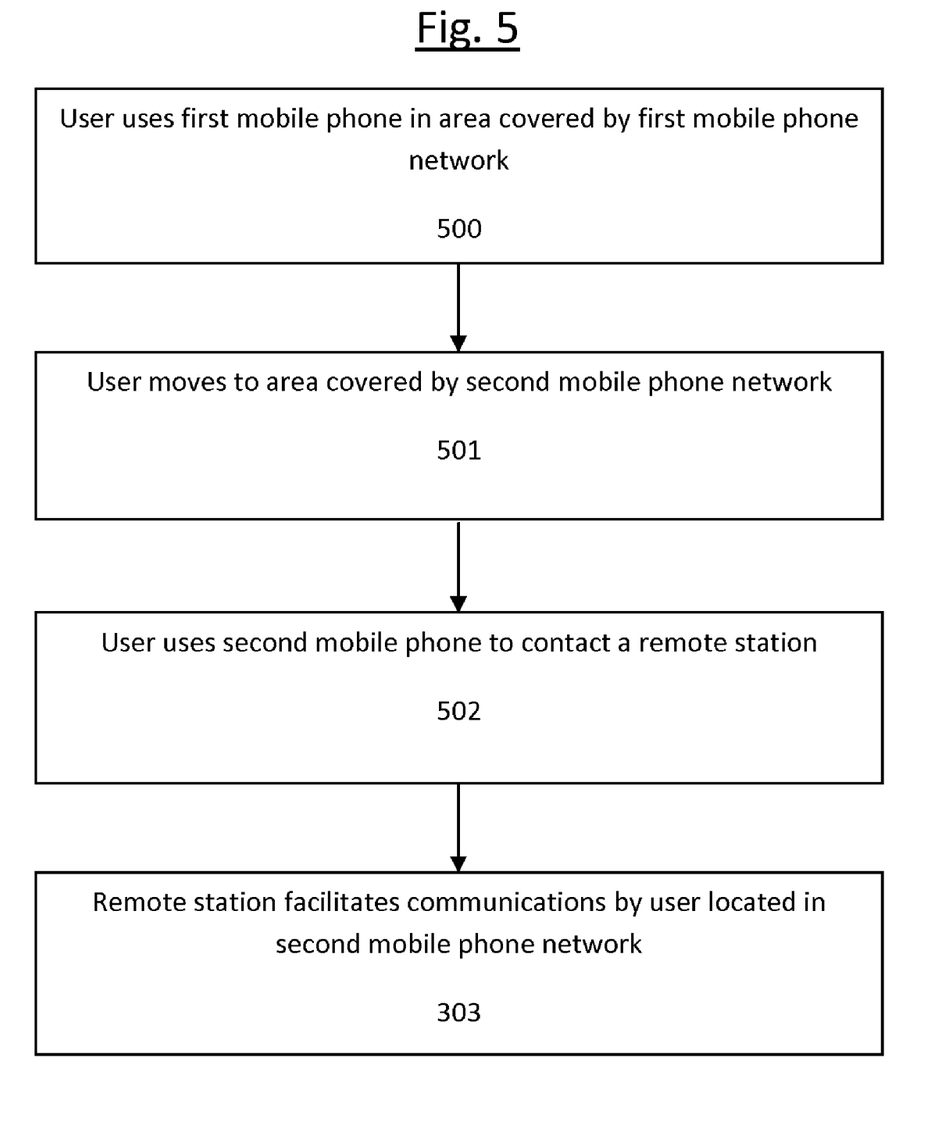
FIG. 5 is a flowchart depicting a mobile telecommunications system for avoiding roaming charges using the system of the present invention.

FIG. 5 is a flowchart reflecting an embodiment of the present invention for avoiding roaming charges. In the first step, the mobile phone user uses a first mobile phone in a geographic area for a first mobile phone network 500. The first mobile phone contains a SIM card that is compatible with the first mobile phone network and with memory storing a preprogrammed phone number directed to a remote station. In this manner, only local charges will be applied to the user's mobile phone use. Eventually, the user moves to a geographic area containing a second mobile phone network 501. Rather than use the first mobile phone in the second network and incur roaming charges, the mobile phone user obtains a second mobile phone 501. The second mobile phone contains a SIM card that is compatible with the second mobile phone network and with memory storing a preprogrammed phone number directed to a remote station. The mobile phone user then uses the second mobile phone to contact a remote station 502. The mobile phone user can then use the contacted remote station to make communications with the second mobile phone 503, through which the user can avoid incurring roaming charges.

In this embodiment, it is preferred that, when the mobile phone user first uses the second phone to contact a remote station 502, the remote station register the second mobile phone to the mobile phone user. This can be accomplished through the use of a security procedure to verify the mobile phone user's identity, such as a passcode or security question. Upon registration, the remote station can transmit the mobile phone user's settings for the first mobile phone to the second mobile phone.

To configure the mobile phone user to receive phone calls with the second mobile phone, the remote station can register the telephone number of the second mobile phone to the mobile phone user. To avoid roaming charges for incoming calls, the remote station can automatically forward calls targeted to the phone number of the first mobile phone to the phone number of the second mobile phone. The remote station could also pick up an incoming call targeted at the first mobile phone, call the mobile phone user at the second mobile phone, and conference the calls. Alternatively, the remote station can transmit settings to the second mobile phone sufficient to change the telephone number of the second mobile phone to the telephone number of the first mobile phone.

Embodiments of the present invention could also include a dispenser for dispensing mobile phones to be used with the present invention. The dispenser would contain mobile phones with SIM cards that are compatible with a mobile phone network in the geographic area where the dispenser is located. These dispensers would preferably be located at points of transit, such as airports, train stations, and bus stations. Accordingly, when a user of the mobile phone system arrives at a point of transit and enters a geographic area where the first mobile phone could incur roaming charges, the mobile phone user merely accesses a dispenser and obtains a second mobile phone with a SIM card that is compatible with a local mobile phone network. The first mobile phone can be recycled at the dispenser area, kept, or even discarded.

Alternatively in another embodiment, roaming charges can also be avoided without having the mobile phone recycled or discarded. This can be accomplished by incorporating a non-volatile memory module in the phone that can store the settings of any SIM card inserted into the phone or that can be downloaded from the remote station. When a mobile phone user enters a geographic location requiring a new SIM card for local service, the user can avoid roaming charges in the traditional manner by inserting an appropriate SIM card. However, when the user enters the same location again and needs to switch a SIM card, the user can instead instruct the remote station to cause the mobile phone to use the registration information of the SIM card that was previously inserted into the phone to obtain local service. In this manner, the user need not open the phone to insert another SIM card. Alternatively, when the user enters a geographic area requiring a new SIM for local service, the user can contact the remote station to download into the phone SIM registration information for that particular geographic area.

It will be appreciated by those skilled in the art having the benefit of this disclosure that numerous variations from the foregoing embodiments will be possible without departing from the inventive concept described herein. Accordingly, it is the claims set forth below, and not merely the foregoing illustrations, which are intended to define the exclusive rights of the invention.

We claim:

1. A system for communicating through a mobile phone, the system comprising:
    a. a buttonless mobile phone that interacts with a user based on a user oral command, user heat, or user capacitance, comprising:
        i. a power supply capable of enabling or disabling power to the buttonless mobile phone; and
        ii. memory to store a phone number directed to a remote station; and
    b. a remote station to receive a call from the mobile phone, the remote station allowing a human operator access to a database describing at least one contact unique to a user, wherein the operator uses the database of contact information to facilitate a communication from the user to the contact described in the database, and wherein the human operator reads to the user a text message sent to the user, wherein a timing or pattern of a touch on the mobile phone distinguishes between commands, where a long period of touching indicates a command to change a power state, while a shorter period of touching indicates a command to pick up an incoming call, and a touch that ascends or descends along a vertical access of the mobile phone indicates a command to respectively increase or decrease the volume of the speaker.

2. The system of claim 1, wherein the communication comprises an email.

3. The system of claim 1, wherein the communication comprises an SMS message.

4. The system of claim 1, wherein the communication comprises an IM message.

5. The system of claim 1, wherein the buttonless mobile phone is without a video screen to reduce power or phone size.

6. The system of claim 1, wherein the buttonless mobile phone is housed in a headset housing.

7. A system, comprising:
    a. a buttonless mobile phone without a video screen, comprising a power supply with means for enabling or disabling the power supply, wherein the buttonless mobile phone interacts with a user based on a user oral command, user heat, or user capacitance;
    b. a remote station comprising a human operator with access to at least one text communication account of a user of the mobile phone; and
    c. the human operator reading to the user of the mobile phone at least some of the content of a text communication from the text communication account, wherein a timing or pattern of a touch on the mobile phone distinguishes between commands, where a long period of touching indicates a command to change a power state, while a shorter period of touching indicates a command to pick up an incoming call, and a touch that ascends or descends along a vertical access of the mobile phone indicates a command to respectively increase or decrease the volume of the speaker.

8. The system of claim 7, wherein the text communication account comprises an email account and where the text communication comprises an email.

9. The system of claim 7, wherein the text communication account comprises an SMS account and where the text communication comprises an SMS message.

10. The system of claim 7, wherein the text communication account comprises an IM account and where the text communication comprises an IM.

11. The system of claim 1, wherein the mobile phone is commanded to pick up an incoming call through monitoring of voice commands through a speaker, followed by a voice command being spoken.

12. The system of claim 1, wherein after the mobile phone is discarded, a replacement mobile phone contacts a remote station to obtain access to the mobile phone user's contacts and email, SMS, or IM accounts.

13. The system of claim 1, wherein a mobile phone comprises multiple SIM cards with registration information for a particular geographical area, wherein each SIM card has a preprogrammed phone number directed to a remote station.

14. The system of claim 1, wherein a textual message is made to mobile phone user, the remote station detects the textual message and calls the mobile phone to notify a mobile phone user of the incoming message, wherein at least some parts of the textual message is orally communicated to the mobile phone user, including an address of the sender, a time, or a specific message, wherein the remote station contains a filter or protocol to minimize "spam" or irrelevant textual message.

15. The system of claim 1, wherein a mobile phone comprises multiple SIM cards with registration information for a particular geographical area, wherein each SIM card has a preprogrammed phone number directed to a remote station, wherein a text communication account comprises an email account and where the text communication comprises an email, wherein the text communication account comprises an SMS account and where the text communication comprises an SMS message.

16. The system of claim 1, wherein a textual message is made to mobile phone user, the remote station detects the textual message and calls the mobile phone to notify a mobile phone user of the incoming message, wherein at least some parts of the textual message is orally communicated to the mobile phone user, including an address of the sender, a time, or a specific message, wherein the remote station contains a filter or protocol to minimize "spam" or irrelevant textual message, wherein the text communication account comprises an email account and where the text communication comprises an email, wherein the text communication account comprises an SMS account and where the text communication comprises an SMS message.

17. The system of claim 1, wherein the mobile phone is commanded to pick up an incoming call through monitoring of voice commands through a speaker, followed by a voice command being spoken and wherein a timing or pattern of a touch distinguishes between commands, where a long period of touching indicates a command to change a power state, while a shorter period of touching indicates a command to pick up an incoming call, and a touch that ascends or descends along a vertical access of the mobile phone indicates a command to respectively increase or decrease the volume of the speaker.

18. The system of claim 1, wherein the mobile phone is without a display screen and wherein the mobile phone is commanded to pick up an incoming call through monitoring of voice commands through a speaker, followed by a voice command being spoken and wherein a timing or pattern of a touch distinguishes between commands, where a long period of touching indicates a command to change a power state, while a shorter period of touching indicates a command to pick up an incoming call, and a touch that ascends or descends along a vertical access of the mobile phone indicates a command to respectively increase or decrease the volume of the speaker.

19. The system of claim 1, wherein a mobile phone comprises multiple SIM cards with registration information for a particular geographical area, wherein each SIM card has a preprogrammed phone number directed to a remote station, wherein the text communication account comprises an email account and where the text communication comprises an email, wherein the text communication account comprises an SMS account and where the text communication comprises an SMS message and wherein the mobile phone is without a display screen and wherein the mobile phone is commanded to pick up an incoming call through monitoring of voice commands through a speaker, followed by a voice command being spoken and wherein a timing or pattern of a touch distinguishes between commands, where a long period of touching indicates a command to change a power state, while a shorter period of touching indicates a command to pick up an incoming call, and a touch that ascends or descends along a vertical access of the mobile phone indicates a command to respectively increase or decrease the volume of the speaker.

* * * * *